UNITED STATES PATENT OFFICE.

ACHILLE BÉRARD, OF OAKLAND, CALIFORNIA, ASSIGNOR OF ONE-HALF HIS RIGHT TO FELIX CHAPPELLETT, OF SAME PLACE.

IMPROVEMENT IN ARTIFICIAL STONE.

Specification forming part of Letters Patent No. 157,903, dated December 15, 1874; application filed September 28, 1874.

*To all whom it may concern:*

Be it known that I, ACHILLE BÉRARD, of Oakland, in the county of Alameda and State of California, have invented an Improved Plan of Manufacturing Artificial Stone for Paving, of which the following is a specification:

My invention relates to that class of stone which is produced by a concrete process; and it consists in a composition formed by mixing two parts of coarse gravel, two parts of sand, two parts of hydraulic lime, and one part of any granular waste iron, such as iron gas-retorts which have been rendered valueless for the ordinary purposes for which iron is used, and sufficiently broken up and pulverized to be mixed with the sand and gravel, and make a ready mixture with the other ingredients. A sufficient quantity of water is added to bring the mass to the consistency of mortar. It is then placed in molds to form the blocks required. It is then carefully dropped from the molds and allowed to dry, when it is ready for use, being a very hard and compact stone, resembling gray granite.

Having thus described my invention, I claim—

The above-described artificial stone as a new article of manufacture, the same consisting of a composition formed by mixing two parts of gravel, two parts of sand, two parts of hydraulic lime, one part of granular waste iron, and water enough to make the mixture of the consistency of mortar, substantially in the manner and for the purposes set forth.

ACHILLE BÉRARD.

Witnesses:
C. NEWHOUSE,
C. E. LARRABE.